Oct. 24, 1933.    A. MISERENTINO    1,931,671

COLLAR PIN

Filed Jan. 17, 1933

Inventor

Angelo Miserentino

By Clarence A. O'Brien
Attorney

Patented Oct. 24, 1933

1,931,671

UNITED STATES PATENT OFFICE 1,931,671

COLLAR PIN

Angelo Miserentino, Newark, N. J.

Application January 17, 1933. Serial No. 652,221

1 Claim. (Cl. 24—155)

My invention relates generally to apparel securing means such as collar or similar pins.

It is an important object of my invention to provide a collar pin or the like particularly adapted for use with men's collars which will secure the tab portions of the collars in the positions in which they may be originally adjusted at the time of connecting the collar pin thereto.

It is also an important object of my invention to provide a collar pin of the type described which, when in place in a collar or the like, will not show unnecessarily any metal parts which are not especially designed for ornamental effect.

It is also an important object of my invention to provide a collar pin of the type described which is longitudinally adjustable so that the collar tabs or the like may be secured in different spaced relations, or the pin arranged for use with collars having different spacings between the tabs thereof.

It is also an important object of my invention to provide a collar pin of the type described wherein parts constructed to be exposed on the exterior of the collar are readily susceptible of ornamentation and variation to suit the taste and pocket-book of the purchaser thereof.

Other objects and advantages of my invention will be apparent from a reading of the following description in connection with the drawing wherein for purposes of illustration I have shown a preferred embodiment of my invention.

Figure 1:
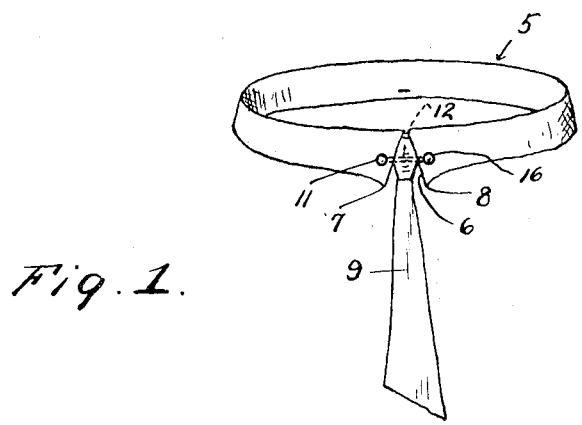
Figure 1 is a perspective view of an embodiment of the invention in use with a collar and necktie.
Figure 2:
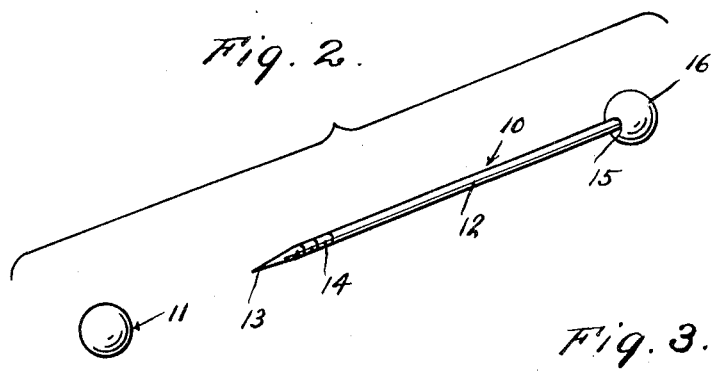
Figure 2 is a group perspective view of the embodiment showing it disassembled.
Figure 3:
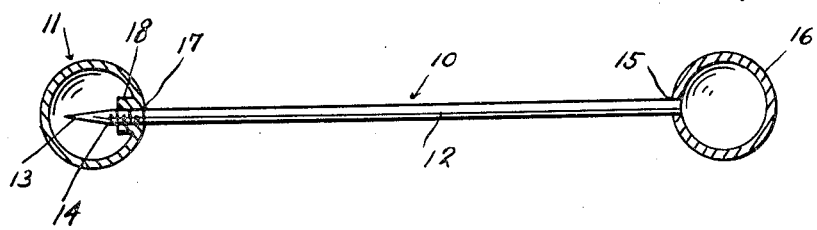
Figure 3 is a longitudinal vertical sectional view through the embodiment.

Referring in detail to the drawing, the numeral 5 refers generally to the conventional form of collar such as worn principally by men having the aperture 6 at the front thereof defined by the opposed tabs 7, 8. A knotted necktie is designated 9.

The embodiment of the invention comprises two principal parts, namely the pin part generally designated 10 and the guard part generally designated 11.

The pin part 10 comprises a thin rod 12 of suitable metal which is pointed as indicated at 13 at one end and immediately inward of this end is provided with an exterior screw thread 14.

The opposite end of the rod 12 is entered and secured in an opening as indicated at 15 in one pole of an ornamental knob 16, which is preferably hollow and large enough so that it will not be drawn through the material of the tab of the collar after the pin or rod 12 has been inserted therein.

The guard portion 11 comprises a similar knob which is provided in one pole with an opening 17. On the interior of the knob 11 is a tubular portion 18 axially alined with the opening 17 and interiorly screw threaded to threadedly receive the screw thread 14 on the pointed end of the pin part 10. The pin part 10 may be screwed into and out of the guard part 11 so as to vary the distance for a purpose pointed out herein.

The knobs 11 and 16 may be substituted, if desired, by bodies of other form according to the ideas of the manufacturer thereof. The knobs and the rod 12 may be constructed of any suitable materials, such as gold, silver, platinum, or the like. If desired the knobs may be set with precious or semi-precious stones.

The pin part 10 is passed through one tab of the collar 5, and under the knot of the necktie 9 and thence through the other tab of the collar from the inward side thereof, so as to expose the point 13 of the rod 12 outwardly. The guard part 11 is then placed over the pointed end of the rod 12 and threaded on the same until the knobs 11, 16 are brought together sufficiently to engage the knobs with the outside of the tabs of the collar and the tabs are sufficiently drawn toward each other. This adjustment of the device of the invention is not disturbed by the motions of the wearer, and the collar tabs are held in the position in which they may have been adjusted at the time of applying the device of the invention.

Though I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claim.

Having thus described my invention, what I claim as new is:

A soft collar pin comprising a bar for passing through the opposed tabs of a soft collar, a point on one end of the bar having a threaded portion, a head on the remaining end of the bar of considerable size and formed on its inward collar tab engaging side with a large bearing surface for engaging the outside of the tab without injuring or wrinkling the same, and a similar head having a threaded opening for receiving the point and the threaded portion of the bar in a manner to be adjustable longitudinally of the bar for adjusting the collar and tabs with respect to each other.

ANGELO MISERENTINO.